United States Patent
Yan et al.

(10) Patent No.: US 12,153,931 B2
(45) Date of Patent: Nov. 26, 2024

(54) CONTROL METHOD, CONTROL DEVICE AND STARTUP SWITCHING DEVICE FOR INTELLIGENT TERMINAL STARTUP

(71) Applicant: Shenzhen SDMC Technology Co.,Ltd., Guangdong (CN)

(72) Inventors: Zhikang Yan, Guangdong (CN); Bo Li, Guangdong (CN)

(73) Assignee: Shenzhen SDMC Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/563,982

(22) PCT Filed: Dec. 2, 2022

(86) PCT No.: PCT/CN2022/140479
§ 371 (c)(1),
(2) Date: Nov. 24, 2023

(87) PCT Pub. No.: WO2023/221497
PCT Pub. Date: Nov. 23, 2023

(65) Prior Publication Data
US 2024/0264842 A1    Aug. 8, 2024

(30) Foreign Application Priority Data

May 18, 2022    (CN) .......................... 202210537349.3

(51) Int. Cl.
*G06F 15/177*    (2006.01)
*G06F 9/4401*    (2018.01)
(52) U.S. Cl.
CPC .......... *G06F 9/4401* (2013.01); *G06F 9/4406* (2013.01)

(58) Field of Classification Search
CPC .................................................... G06F 9/4401
(Continued)

(56) References Cited

U.S. PATENT DOCUMENTS 6,732,925 B1 * 5/2004 Takayasu ............. G06K 7/0004
235/459
6,957,286 B1 * 10/2005 Cohen ..................... G06F 9/441
713/2

(Continued)

FOREIGN PATENT DOCUMENTS

CN    1685436 A       10/2005
CN    101211268 A  *   7/2008
(Continued)

OTHER PUBLICATIONS

International Search Report of PCT/CN2022/140479.
Written Opinion of PCT/CN2022/140479.

*Primary Examiner* — Volvick Derose

(57) ABSTRACT

Disclosed are a control method, a control device and a startup switching device for intelligent terminal startup, where the control method includes: detecting whether a startup switching device is inserted after a power-on trigger signal is received; starting up the intelligent terminal through a first ROM when no startup switching device is inserted; reading specified information in a high definition multimedia interface when the startup switching device is inserted; and starting up the intelligent terminal through a preset ROM when the specified information is preset switching data, thereby solving the problems that the intelligent terminal startup switching is cumbersome and of poor safety by using a jumper cap in the prior art.

4 Claims, 5 Drawing Sheets

(58) Field of Classification Search
USPC .............................................................. 713/2
See application file for complete search history.

(56) References Cited

U.S. PATENT DOCUMENTS

| | | | | |
|---|---|---|---|---|
| 2003/0155420 | A1* | 8/2003 | Morrow | G06F 13/385 |
| | | | | 235/449 |
| 2005/0086433 | A1* | 4/2005 | Okaue | G06K 19/077 |
| | | | | 711/115 |
| 2012/0115546 | A1* | 5/2012 | Lin | G06K 19/0701 |
| | | | | 455/558 |
| 2016/0357270 | A1* | 12/2016 | Chen | G09G 5/003 |
| 2017/0214423 | A1* | 7/2017 | Park | H04B 1/3816 |
| 2019/0129801 | A1* | 5/2019 | Lambert | G06F 11/0721 |

FOREIGN PATENT DOCUMENTS

| | | |
|---|---|---|
| CN | 205092865 U | 3/2016 |
| CN | 108196894 A | 6/2018 |
| CN | 112214249 A | 1/2021 |
| CN | 114647500 A | 6/2022 |
| CN | 114637544 B | 8/2022 |

\* cited by examiner

CONTROL METHOD, CONTROL DEVICE AND STARTUP SWITCHING DEVICE FOR INTELLIGENT TERMINAL STARTUP

CROSS-REFERENCE TO RELATED APPLICATION

This application claims priority from the Chinese patent application 202210537349.3 filed May 18, 2022, the content of which is incorporated herein in the entirety by reference.

TECHNICAL FIELD

The present disclosure relates to the technical field of intelligent terminal startup, and in particular to a control method, a control device and a startup switching device for intelligent terminal startup.

BACKGROUND

In the current market environment, a conventional intelligent terminal generally has only one startup solution, that is, the terminal is started up from a large-capacity read-only memory (ROM), such as an embedded multimedia card (EMMC) module, and this startup mode needs to ensure that a startup code stored in the ROM is correct, otherwise, once the content in the ROM is damaged, the intelligent terminal system cannot be started, or even become bricked.

In order to solve the above problem, the related art adopts a jumper cap mode, allowing the intelligent terminal to be started from a second ROM. In this solution, the jumper cap is generally hidden inside a bare machine, and the intelligent terminal shell can be disassembled to manually shift the jumper cap, when necessary. However, this method is cumbersome to operate and not conducive to switching or debugging by users or development engineers, and it is of poor safety, and users can switch the intelligent terminal to another unauthorized system in a jumper wire mode, causing losses to a company.

SUMMARY

The present disclosure aims to solve the technical problems that the intelligent terminal startup switching is cumbersome and of poor safety by using a jumper cap in the prior art, thereby providing a control method, a control device and a startup switching device for intelligent terminal startup.

In order to solve the above technical problems, the present disclosure provides a control method, a control device and a startup switching device for intelligent terminal startup.

In a first aspect, a disclosed embodiment of the present disclosure provides a control method for intelligent terminal, including:
  detecting whether a startup switching device is inserted after a power-on trigger signal is received;
  starting up the intelligent terminal through a first ROM when no startup switching device is inserted;
  reading specified information in the HDMI when the startup switching device is inserted; and
  starting up the intelligent terminal through a preset ROM when the specified information is preset switching data.

Optionally, the switching device is provided with a switching button, and "starting up the intelligent terminal through a preset ROM" includes: determining the state of the switching button, and each state of the switching button corresponds to one preset ROM; and determining the corresponding preset ROM according to the state of the switching button.

Optionally, the state of the switching button includes a triggered state and a non-triggered state, and "determining the preset ROM according to the state of the switching button" includes: starting up the intelligent terminal through a first preset ROM when the switching button is in the triggered state; and starting up the intelligent terminal through a second preset ROM when the switching button is in the non-triggered state.

Optionally, "detecting whether a startup switching device is inserted" includes: detecting device information of an inserted device; and then determining whether the device information is the information of the preset startup device: the inserted device is a startup switching device when the device information is the information of the preset startup device; and no startup switching device is inserted when the device information is not the information of the preset startup device.

Optionally, the specified information is the extended display identification data (EDID).

Optionally, the state of the switching button is determined as follows: the source end of a high definition multimedia interface (HDMI) detects the state of the switching button through a hot plug detection pin of the HDMI.

In a second aspect, a disclosed embodiment of the present disclosure provides a control device for intelligent terminal, including:
  a switching device detection module being configured to detect whether a startup switching device is inserted after a power-on trigger signal is received;
  a first startup module being configured to start up the intelligent terminal through a first ROM when no startup switching device is inserted;
  a high definition multimedia interface (HDMI) identification module being configured to read specified information in the HDMI when the startup switching device is inserted; and
  a second startup module being configured to start up the intelligent terminal through a preset ROM when the specified information is preset switching data.

In a third aspect, a disclosed embodiment of the present disclosure further provides a startup switching device for intelligent terminal startup, including:
  an information storage module being configured to record information of a preset startup device, and when the startup switching device is used for startup switching of an intelligent terminal, the intelligent terminal identifies the startup switching device through the information of the preset startup device; and
  a switching button, where the intelligent terminal determines to start up a preset ROM of the intelligent terminal according to the state of the switching button.

In a fourth aspect, a disclosed embodiment of the present disclosure further provides a computer device, including a processor, a memory and a bus, where the memory stores machine-readable instructions executable by the processor, the processor communicates with the memory through the bus when the computer device is running, and the machine-readable instructions, when being executed by the processor, can execute the steps as described in the first aspect above, or any possible implementation of the first aspect.

In a fifth aspect, a disclosed embodiment of the present disclosure further provides a computer-readable storage medium, where the computer-readable storage medium stores a computer program, and the computer program, when being executed by a processor, can execute the steps as described in the first aspect above, or any possible implementation of the first aspect.

The technical solution provided in the embodiments of the present disclosure has the following beneficial effects:

it can whether the startup switching device is inserted after receiving the power-on trigger signal: the intelligent terminal is started up through the first ROM when no startup switching device is inserted; and the intelligent terminal is started up through the preset ROM when the startup switching device is inserted. After the device is adopted, a multi-system switching function can be popularized, enriching the application scenarios of the intelligent terminal, so that one device can support switching among a plurality of activation modes. On the one hand, using the device will help reduce maintenance costs of the intelligent terminal when it suffers fault, and it is unnecessary to disassemble the intelligent terminal for debugging, nor a specific physic interface is required for switching, the switching can be realized with the help of the HDMI, and the cost of the device is lower. On the other hand, when the system of the first ROM is damaged, the second ROM can be started immediately, and the system of the first ROM can be recovered with the help of the second system.

It should be understood that the above general description and the following detailed description are only illustrative and explanatory, and cannot limit the present disclosure.

BRIEF DESCRIPTION OF THE DRAWINGS

In order to more clearly illustrate technical solutions in the specific implementations of the present disclosure or in the prior art, a brief introduction to the accompanying drawings required for the description of the specific implementations or the prior art will be provided below. Obviously, the accompanying drawings in the following description are some of the implementations of the present disclosure, and those of ordinary skill in the art may still derive other drawings from these accompanying drawings without any creative effort.

DETAILED DESCRIPTIONS OF THE EMBODIMENTS

The embodiments will be described in detail herein and shown in the accompanying drawings illustratively. When the following descriptions relate to the accompanying drawings, unless otherwise specified, the same numeral in different accompanying drawings denotes the same or similar element. The implementation modes described in the following illustrative embodiments do not represent all implementation modes consistent with the embodiment of the disclosure. Rather, they are merely instances of apparatus and methods consistent with some aspects of the examples of the disclosure as described in detail in the appended claims.

Embodiment 1

Figure 1:
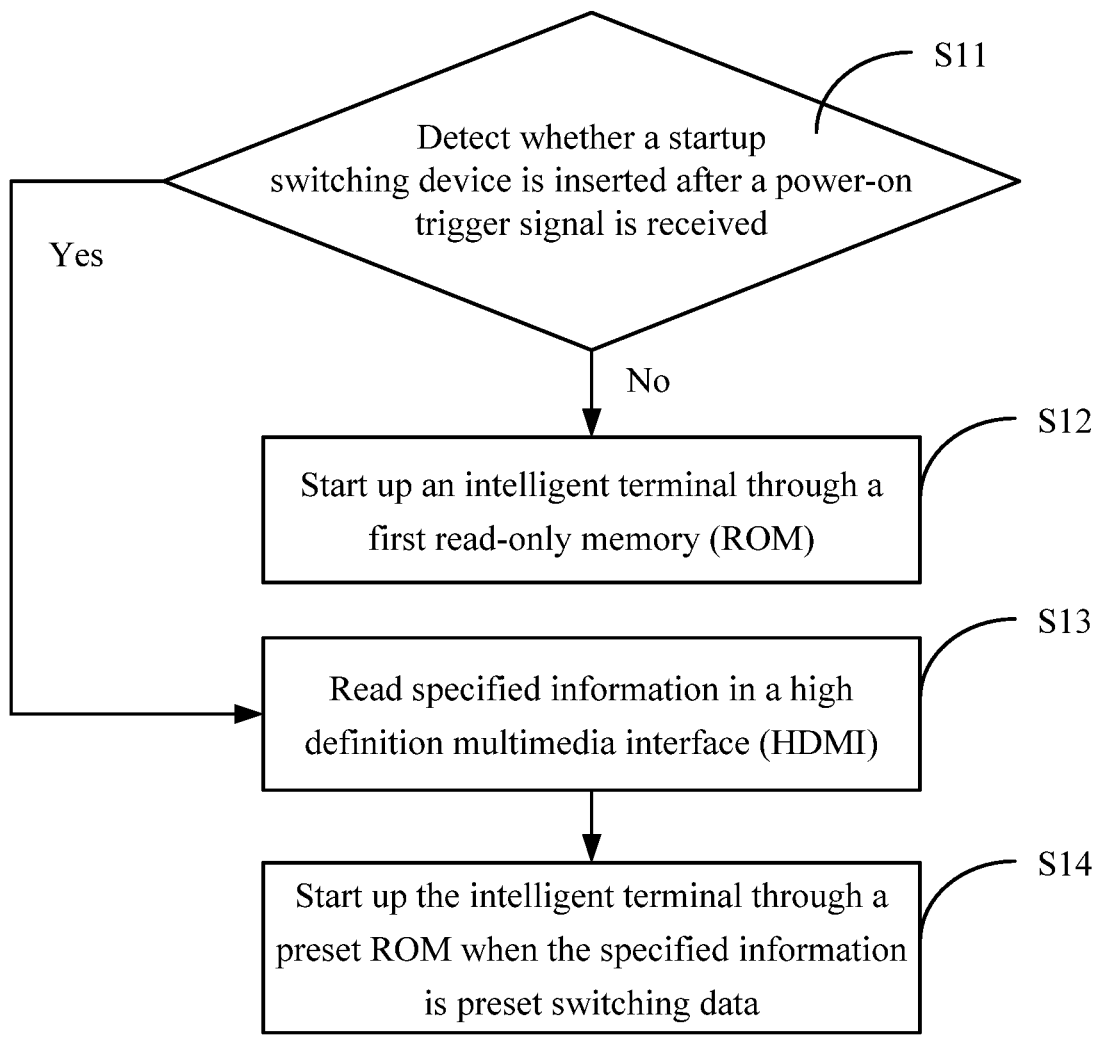
FIG. 1 shows a flow chart of a control method for intelligent terminal startup provided by a disclosed embodiment of the present disclosure.

As shown in FIG. 1, it shows a flow chart of a control method for intelligent terminal startup provided by a disclosed embodiment of the present disclosure, and the method includes:

S11: detecting whether a startup switching device is inserted after a power-on trigger signal is received, step S12 should be executed when no startup switching device is inserted, otherwise step S13 should be executed;

S12: starting up an intelligent terminal through a first read-only memory (ROM);

S13: reading specified information in a high definition multimedia interface (HDMI); and S14: starting up the intelligent terminal through a preset ROM when the specified information is preset switching data.

It can be understood that, in the technical solution provided in this embodiment, it can detected whether the startup switching device is inserted after a power-on trigger signal is received: the intelligent terminal is started up through the first ROM when no startup switching device is inserted; and the intelligent terminal is started up through the preset ROM when the startup switching device is inserted. After the device is adopted, a multi-system switching function can be popularized, enriching the application scenarios of the intelligent terminal, so that one device can support switching among a plurality of activation modes. On the one hand, using the device will help reduce maintenance costs of the intelligent terminal when it suffers fault, and it is unnecessary to disassemble the intelligent terminal for debugging, nor a specific physic interface is required for switching, the switching can be realized with the help of the HDMI, and the cost of the device is lower. On the other hand, when the system of the first ROM is damaged, the second ROM can be started immediately, and the system of the first ROM can be recovered with the help of the second system.

Embodiment 2

Figure 2:
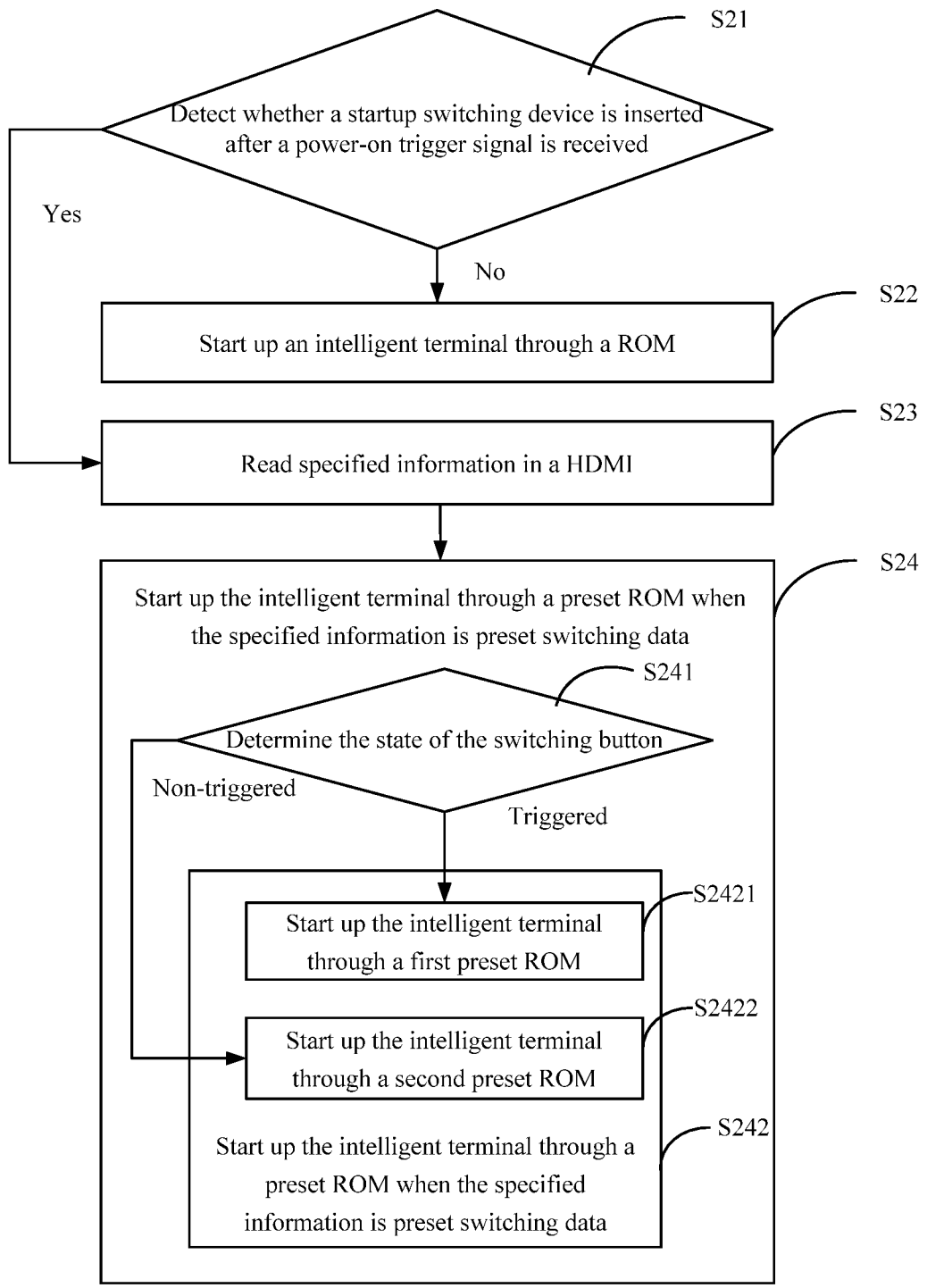
FIG. 2 shows a flow chart of another control method for intelligent terminal startup provided by a disclosed embodiment of the present disclosure.

As shown in FIG. 2, it shows a flow chart of another control method for intelligent terminal startup provided by a disclosed embodiment of the present disclosure, and the method includes:

S21: detecting whether a startup switching device is inserted after a power-on trigger signal is received, step 22 should be executed when no startup switching device is inserted, otherwise step 23 should be executed;

S22: starting up an intelligent terminal through a first read-only memory (ROM);

S23: reading specified information in a high-definition multimedia interface (HDMI); and S24: starting up the intelligent terminal through a preset ROM when the specified information is preset switching data.

In specific practice, the switching device is provided with a switching button, and the step S24 "starting up the intelligent terminal through a preset ROM" includes:

S241: determining the state of the switching button, where each state of the switching button corresponds to one preset ROM; and S242: determining the corresponding preset ROM according to the state of the switching button.

In specific practice, the state of the switching button includes a triggered state and a non-triggered state, and the step S242 "determining the corresponding preset ROM according to the state of the switching button" includes:

S2421: starting up the intelligent terminal through a first preset ROM when the switching button is in the triggered state; and S2422: starting up the intelligent terminal through a second preset ROM when the switching button is in the non-triggered state.

In specific practice, the step S21 "detecting whether a startup switching device is inserted" includes:

S211: detecting device information of an inserted device;

S212: determining whether the device information is the information of the preset startup device, in some embodiments, a manufacturer identifier is used for determining whether the inserted device is a startup switching device;

S213: the inserted device is a startup switching device when the device information is the information of the preset startup device;

S214: no startup switching device is inserted when the device information is not the information of the preset startup device.

In specific practice, the specified information is the extended display identification data (EDID).

In specific practice, the state of the switching button is determined as follows: the source end of the HDMI detects the state of the switching button through a hot plug detection pin of the HDMI.

In specific practice, a main control chip reads the EDID in the HDMI, and when the manufacturer identifier of the startup switching device is consistent with a preset identifier, the display name descriptor is then determined, specifically, a suffix in the display name descriptor can be taken, and when the suffix is consistent with the preset identifier, and the switching button is not pressed at that moment, the intelligent terminal will be started up through the second preset ROM. When the switching button is pressed, the intelligent terminal will be started up through the first preset ROM. The button event is used for controlling a power supply switch, and the source end of the HDMI of the intelligent terminal detects the event through the hot plug detection (HPD) pin of the HDMI upon the hot plug principle of the HDMI, so that the startup by the first preset ROM is realized.

It can be understood that, in the technical solution provided in this embodiment, it can detected whether the startup switching device is inserted after a power-on trigger signal is received: the intelligent terminal is started up through the first ROM when no startup switching device is inserted; and the intelligent terminal is started up through the preset ROM when the startup switching device is inserted. After the device is adopted, a multi-system switching function can be popularized, enriching the application scenarios of the intelligent terminal, so that one device can support switching among a plurality of activation modes. On the one hand, using the device will help reduce maintenance costs of the intelligent terminal when it suffers fault, and it is unnecessary to disassemble the intelligent terminal for debugging, nor a specific physic interface is required for switching, the switching can be realized with the help of a high definition multimedia interface (HDMI), and the cost of the device is lower. On the other hand, when the system of the first ROM is damaged, the second ROM can be started immediately, and the system of the first ROM can be recovered with the help of the second system. With the help of the HDMI of the intelligent terminal, a plurality of startup modes can be switched, which is convenient and safe.

Embodiment 3

Figure 3:
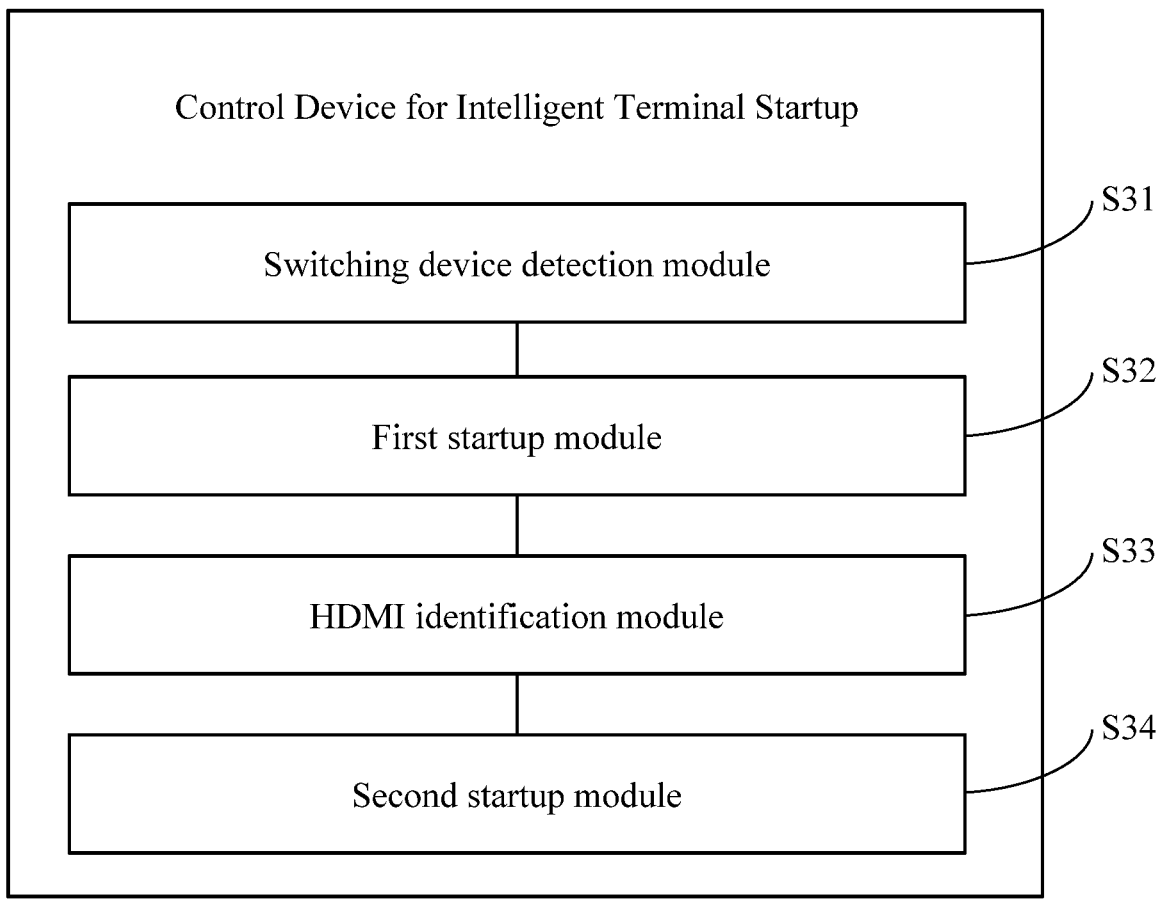
FIG. 3 is a schematic structural diagram of a control device for intelligent terminal startup provided by a disclosed embodiment of the present disclosure.

As shown in FIG. 3, an embodiment of the present disclosure further provides a control device for intelligent terminal startup, including:

a switching device detection module 31 being configured to detect whether a startup switching device is inserted after a power-on trigger signal is received;

a first startup module 32 being configured to start up the intelligent terminal through a first ROM when no startup switching device is inserted;

a high definition multimedia interface (HDMI) identification module 33 being configured to read specified information in the HDMI when the startup switching device is inserted; and a second startup module 34 being configured to start up the intelligent terminal through a preset ROM when the specified information is preset switching data.

In specific practice, the switching device is provided with a switching button, and the second startup module 34 "being configured to start up the intelligent terminal through a preset ROM" includes: the second startup module 34 firstly determines the state of the switching button, and each state of the switching button corresponds to one preset ROM; and then determines the corresponding preset ROM according to the state of the switching button.

In specific practice, the state of the switching button includes a triggered state and a non-triggered state, and the second startup module 34 "determining the preset ROM according to the state of the switching button" includes: starting up the intelligent terminal through a first preset ROM when the switching button is in the triggered state; and starting up the intelligent terminal through a second preset ROM when the switching button is in the non-triggered state.

In specific practice, the switching device detection module 31 "being configured to detect whether a startup switching device is inserted" includes: the switching device detection module 31 firstly detects device information of an inserted device; and then determines whether the device information is the information of the preset startup device: the inserted device is a startup switching device when the device information is the information of the preset startup device; and no startup switching device is inserted when the device information is not the information of the preset startup device.

In specific practice, the specified information is the EDID.

In specific practice, the state of the switching button is determined as follows: the source end of the HDMI detects the state of the switching button through a hot plug detection pin of the HDMI.

It can be understood that, in the technical solution provided in this embodiment, it can detected whether the startup switching device is inserted after a power-on trigger signal is received: the intelligent terminal is started up through the first ROM when no startup switching device is inserted; and the intelligent terminal is started up through the preset ROM when the startup switching device is inserted. After the device is adopted, a multi-system switching function can be popularized, enriching the application scenarios of the intelligent terminal, so that one device can support switching among a plurality of activation modes. On the one hand, using the device will help reduce maintenance costs of the intelligent terminal when it suffers fault, and it is unnecessary to disassemble the intelligent terminal for debugging, nor a specific physic interface is required for switching, the switching can be realized with the help of a high definition multimedia interface (HDMI), and the cost of the device is lower. On the other hand, when the system of the first ROM is damaged, the second ROM can be started immediately, and the system of the first ROM can be recovered with the help of the second system.

Embodiment 4

Figure 4:
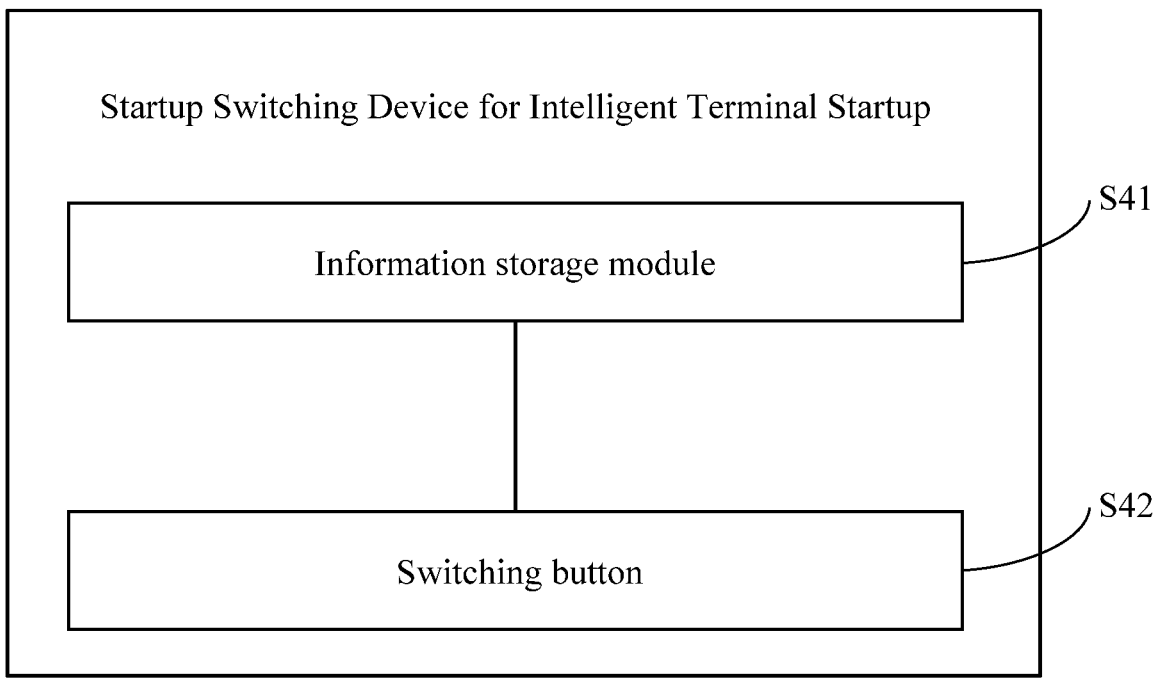
FIG. 4 is a schematic structural diagram of a startup switching device for intelligent terminal startup provided by a disclosed embodiment of the present disclosure.

As shown in FIG. 4, an embodiment of the present disclosure further provides a startup switching device for intelligent terminal startup, including:

an information storage module 41 being configured to record information of a preset startup device, and when the startup switching device is used for startup switching of an intelligent terminal, the intelligent terminal identifies the startup switching device through the information of the preset startup device; and a switching button 42, where the intelligent terminal determines to start up a preset ROM of the intelligent terminal according to the state of the switching button.

It can be understood that, in the technical solution provided in this embodiment, it can detected whether the startup switching device is inserted after a power-on trigger signal is received: the intelligent terminal is started up through the first ROM when no startup switching device is inserted; and the intelligent terminal is started up through the preset ROM when the startup switching device is inserted. After the device is adopted, a multi-system switching function can be popularized, enriching the application scenarios of the intelligent terminal, so that one device can support switching among a plurality of activation modes. On the one hand, using the device will help reduce maintenance costs of the intelligent terminal when it suffers fault, and it is unnecessary to disassemble the intelligent terminal for debugging, nor a specific physic interface is required for switching, the switching can be realized with the help of a high definition multimedia interface (HDMI), and the cost of the device is lower. On the other hand, when the system of the first ROM is damaged, the second ROM can be started immediately, and the system of the first ROM can be recovered with the help of the second system.

Embodiment 5

Figure 5:
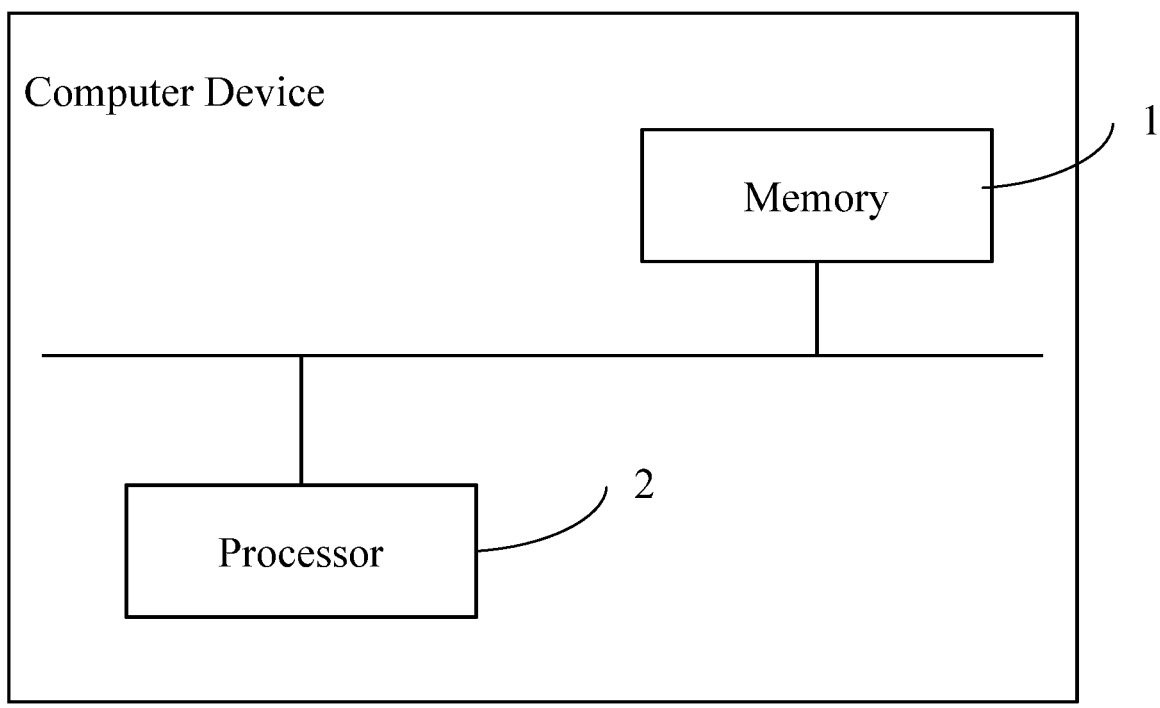
FIG. 5 is a schematic structural diagram of a computer device provided by a disclosed embodiment of the present disclosure.

Based on the same technical concept, an embodiment of the present disclosure further provides a computer device, including a memory 1 and a processor 2, as shown in FIG. 5, the memory 1 stores a computer program, and the processor 2 implements the control method for intelligent terminal startup as described in any one of the above when executing the computer program.

The memory 1 includes at least one type of readable storage medium, including a flash memory, a hard disk, a multimedia card, a card-type memory (for example, SD or DX memory, and the like), a magnetic memory, a magnetic disk, an optical disk, and the like. In some embodiments, the memory 1 can be an internal storage unit of an OTT video service monitoring system, such as a hard disk. In some other embodiments, the memory 1 can also be an external storage device of an OTT video service monitoring system, such as a plug-in hard disk, a smart media card (SMC), a secure digital (SD) card, a flash memory card (Flash Card), and the like. Further, the memory 1 can also include both an internal storage unit and an external storage device of an OTT video service monitoring system. The memory 1 can be used to not only store application software installed in the OTT video service monitoring system and various data, such as codes of an OTT video service monitoring program, but also temporarily store data that have been output or will be output. [0084] In some embodiment, the processor 2 can be a central processing unit (CPU), a controller, a microcontroller, a microprocessor or other data processing chips, and the processor is configured to run program codes or processing data stored in the memory 1, such as executing an OTT video service monitoring program.

It can be understood that, in the technical solution provided in this embodiment, it can detected whether the startup switching device is inserted after a power-on trigger signal is received: the intelligent terminal is started up through the first ROM when no startup switching device is inserted; and the intelligent terminal is started up through the preset ROM when the startup switching device is inserted. After the device is adopted, a multi-system switching function can be popularized, enriching the application scenarios of the intelligent terminal, so that one device can support switching among a plurality of activation modes. On the one hand, using the device will help reduce maintenance costs of the intelligent terminal when it suffers fault, and it is unnecessary to disassemble the intelligent terminal for debugging, nor a specific physic interface is required for switching, the switching can be realized with the help of the HDMI, and the cost of the device is lower. On the other hand, when the system of the first ROM is damaged, the second ROM can be started immediately, and the system of the first ROM can be recovered with the help of the second system.

A disclosed embodiment of the present disclosure further provides a computer-readable storage medium, where the computer-readable storage medium stores a computer program, and the computer program, when being executed by a processor, can execute the steps of the control method for intelligent terminal startup as described in the embodiments above. The storage medium can be a volatile or non-volatile computer-readable storage medium.

A computer program product of the control method for intelligent terminal startup provided in an embodiment of the present disclosure includes a computer-readable storage medium storing program codes, where instructions included in the program codes can be used to execute the steps of the control method for intelligent terminal startup described in the above method embodiments, which can be referred to the method in the above embodiments and are not repeated any more herein. A disclosed embodiment of the present disclosure further provides a computer program, and when being executed by a processor, the computer program implements any of the methods described in the above embodiments. The computer program product may be implemented specifically through hardware, software or a combination thereof. In an alternative embodiment, the computer program product is embodied in a computer storage medium, and in another alternative embodiment, the computer program product is embodied in a software product, such as a software development kit (SDK) or the like.

It can be understood that the same or similar parts in the above embodiments can be referred to each other, and the content that is not described in detail in some embodiments can be referred to the same or similar parts in other embodiments.

It should be noted that the terms "first," "second," and the like, in the description of the present disclosure are used for descriptive purposes only, and cannot be construed as indicating or implying relative importance. In addition, "a plurality of" in the description of the present disclosure means two or more, unless otherwise expressly specified.

Any process or method descriptions in flow charts or otherwise described herein may be understood as: representing modules, segments, or portions of code that include one or more executable instructions for implementing specific logical functions or steps in the process. Alternate implementations are included within the scope of embodiments of the present disclosure in which functions can be executed out of order from that shown or discussed, including in a substantially concurrent manner or in reverse order, depending on the functionality involved, as would be understood by those ordinarily skilled in the art to which the embodiments of the present disclosure belong.

It should be understood that various parts of the present disclosure can be implemented with hardware, software, firmware, or a combination thereof. In the above embodiments, a plurality of steps or methods can be implemented with software or firmware stored in memory and executed by a suitable instruction execution system. x For example, when being implemented with hardware, as in another implementation, it can be implemented by any one or a combination of the following techniques known in the art: discrete logic circuits having logic gates for implementing logic functions on data signals, specialized integrated circuits having suitable combinations of logic gates, programmable gate arrays (PGAs), field programmable gate arrays (FPGAs), and the like.

Those of ordinary skill in the art can understand that all or some of the steps carried by the method of the above embodiments can be implemented by instructing relevant hardware by means of a program, the program can be stored in a computer-readable storage medium which, when executed, caused one of the steps of the method embodiments or a combination thereof to be performed.

In addition, each functional unit in the various embodiments of the present disclosure can be integrated into a processing module, or an individual unit can physically exist alone, or two or more units can be integrated into a single module. The integrated module can be implemented either in the form of hardware or in the form of software functional modules. The integrated module can also be stored in a computer-readable storage medium when it is implemented in the form of software functional modules, and sold or used as a standalone product.

The aforesaid storage medium can be a read-only memory, a disk or a CD-ROM, and the like.

In the statement of the description, description with reference to terms of "one embodiment", "some embodiments", "example(s)", "specific example", or "some examples" means that specific features, structures, materials, or characteristics described in combination with the embodiment(s) or example(s) are included in at least one embodiment or example of the present disclosure. In the description, the schematic descriptions of the above terms do not necessarily refer to the same embodiment or example. Moreover, the specific feature, structure, material or characteristics described may be combined in a suitable manner in any one or more embodiments or examples.

Although the embodiments of the disclosure have been shown and described above, it can be understood that the above embodiments are exemplary, and cannot be construed as limitations of the disclosure, and those of ordinary skill in the art make can make changes, modifications, substitutions and alterations to the above embodiments with the scope of the disclosure.

What is claimed is:

1. A control method for intelligent terminal startup with a startup switching device being inserted, comprising:
    detecting whether a startup switching device is inserted after a power-on trigger signal is received; starting up the intelligent terminal through a first read-only memory (ROM) when no startup switching device is inserted;
    reading specified information in a high definition multimedia interface—(HDMI) when the startup switching device is inserted;
    starting up the intelligent terminal through a preset ROM when the specified information is preset switching data; wherein the switching device is provided with a switching button, and "starting up the intelligent terminal through a preset ROM" comprises: determining the state of the switching button, and each state of the switching button corresponds to one preset ROM; and determining the corresponding preset ROM according to the state of the switching button;
    the state of the switching button is determined as follows: the source end of a high definition multimedia interface (HDMI) detects the state of the switching button through a hot plug detection pin of the HDMI;
    wherein the state of the switching button comprises a triggered state and a non-triggered state, and "determining the preset ROM according to the state of the switching button" comprises:
    starting up the intelligent terminal through a first preset ROM when the switching button is in the triggered state; and starting up the intelligent terminal through a second preset ROM when the switching button is in the non-triggered state;
    wherein "detecting whether a startup switching device is inserted" comprises:
    detecting device information of an inserted device;
    determining whether the device information is the information of the preset startup device;
    the inserted device is a startup switching device when the device information is the information of the preset startup device;
    no startup switching device is inserted when the device information is not the information of the preset startup device;
    the specified information is the extended display identification data (EDID);
    a main control chip reads the EDID in the HDMI, and when a manufacturer identifier of the startup switching device is consistent with a preset identifier, a display name descriptor is then determined, and a suffix in the display name descriptor is taken, and when the suffix is consistent with the preset identifier, and the switching button is not pressed at that moment, the intelligent terminal will be started up through the second preset ROM; when the switching button is pressed, the intelligent terminal will be started up through the first preset ROM; a button event is used for controlling a power supply switch, and the source end of the HDMI of the intelligent terminal detects the event through the hot plug detection (HPD) pin of the HDMI upon the hot plug principle of the HDMI, so that the startup by the first preset ROM is realized;

the startup switching device for intelligent terminal startup comprises (1) an information storage module being configured to record information of a preset startup device, and when the startup switching device is used for startup switching of an intelligent terminal, the intelligent terminal identifies the startup switching device through the information of the preset startup device; and (2) a switching button, wherein the intelligent terminal determines to start up a preset ROM of the intelligent terminal according to the state of the switching button; and using the device reduces maintenance costs of the intelligent terminal when the intelligent terminal suffers fault, and it is unnecessary to disassemble the intelligent terminal for debugging, nor a specific physic interface is required for switching, the switching can be realized with a help of the HDMI, and cost of the device is lower; when the first ROM is damaged, the second ROM can be started immediately, and the first ROM can be recovered with the help of the second system.

2. A computer device, comprising a processor, a memory and a bus, wherein the memory stores machine-readable instructions executable by the processor, the processor communicates with the memory through the bus when the computer device is running, and the machine-readable instructions, when being executed by the processor, can execute the control method for intelligent terminal startup according to claim 1.

3. A computer-readable storage medium, wherein a computer program is stored on the computer-readable storage medium, and the computer program, when being executed by a processor, execute the control method for intelligent terminal startup according to claim 1.

4. A control device for intelligent terminal startup with a startup switching device being inserted, comprising:

a switching device detection module being configured to detect whether a startup switching device is inserted after a power-on trigger signal is received; first startup module being configured to start up the intelligent terminal through a first ROM when no startup switching device is inserted;

a high definition multimedia interface (HDMI) identification module being configured to read specified information in the HDMI when the startup switching device is inserted; and a second startup module being configured to start up the intelligent terminal through a preset ROM when the specified information is preset switching data, wherein the switching device is provided with a switching button, and "starting up the intelligent terminal through a preset ROM" comprises: determining the state of the switching button, and each state of the switching button corresponds to one preset ROM; and determining the corresponding preset ROM according to the state of the switching button; and the state of the switching button is determined as follows: the source end of a high definition multimedia interface (HDMI) detects the state of the switching button through a hot plug detection pin of the HDMI;

wherein the state of the switching button comprises a triggered state and a non-triggered state, and "determining the preset ROM according to the state of the switching button" comprises:

starting up the intelligent terminal through a first preset ROM when the switching button is in the triggered state; and starting up the intelligent terminal through a second preset ROM when the switching button is in the non-triggered state;

wherein "detecting whether a startup switching device is inserted" comprises:

detecting device information of an inserted device;

determining whether the device information is the information of the preset startup device;

the inserted device is a startup switching device when the device information is the information of the preset startup device;

no startup switching device is inserted when the device information is not the information of the preset startup device; the specified information is the extended display identification data (EDID);

a main control chip reads the EDID in the HDMI, and when a manufacturer identifier of the startup switching device is consistent with a preset identifier, a display name descriptor is then determined, and a suffix in the display name descriptor is taken, and when the suffix is consistent with the preset identifier, and the switching button is not pressed at that moment, the intelligent terminal will be started up through the second preset ROM; when the switching button is pressed, the intelligent terminal will be started up through the first preset ROM; a button event is used for controlling a power supply switch, and the source end of the HDMI of the intelligent terminal detects the event through the hot plug detection (HPD) pin of the HDMI upon the hot plug principle of the HDMI, so that the startup by the first preset ROM is realized;

the startup switching device for intelligent terminal startup comprises (1) an information storage module being configured to record information of a preset startup device, and when the startup switching device is used for startup switching of an intelligent terminal, the intelligent terminal identifies the startup switching device through the information of the preset startup device; and (2) a switching button, wherein the intelligent terminal determines to start up a preset ROM of the intelligent terminal according to the state of the switching button; and using the device reduces maintenance costs of the intelligent terminal when the intelligent terminal suffers fault, and it is unnecessary to disassemble the intelligent terminal for debugging, nor a specific physic interface is required for switching, the switching can be realized with a help of the HDMI, and cost of the device is lower; when the first ROM is damaged, the second ROM can be started immediately, and the first ROM can be recovered with the help of the second system.

* * * * *